United States Patent
Marable et al.

(10) Patent No.: US 8,282,122 B2
(45) Date of Patent: Oct. 9, 2012

(54) AIRBAG ASSEMBLY

(75) Inventors: Paul Mark Marable, Rayleigh (GB); Timothy Scott, Benfleet (GB); Allen C. Bosio, Basildon (GB)

(73) Assignee: Ford Global Technologies, LLC, Dearborn, MI (US)

(*) Notice: Subject to any disclaimer, the term of this patent is extended or adjusted under 35 U.S.C. 154(b) by 97 days.

(21) Appl. No.: 12/842,182

(22) Filed: Jul. 23, 2010

(65) Prior Publication Data

US 2011/0018240 A1    Jan. 27, 2011

(30) Foreign Application Priority Data

Jul. 23, 2009 (GB) .................................. 0912843.0
Nov. 19, 2009 (GB) .................................. 0920280.5

(51) Int. Cl.
*B60R 21/233* (2006.01)
*B60R 21/2338* (2006.01)
*B60R 21/239* (2006.01)

(52) U.S. Cl. ....................... 280/729; 280/739; 280/743.2

(58) Field of Classification Search .................. 280/729, 280/739, 743.2, 742
See application file for complete search history.

(56) References Cited

U.S. PATENT DOCUMENTS

| | | | | |
|---|---|---|---|---|
| 3,642,303 A | * | 2/1972 | Irish et al. ................... | 280/730.1 |
| 3,990,726 A | * | 11/1976 | Oka et al. ...................... | 280/739 |
| 5,520,413 A | | 5/1996 | Mossi et al. | |
| 5,536,038 A | * | 7/1996 | Bollaert et al. ............ | 280/730.2 |
| 5,685,562 A | * | 11/1997 | Jordan et al. ................... | 280/739 |
| 6,149,194 A | * | 11/2000 | Breed et al. ................ | 280/743.1 |
| 6,561,544 B1 | | 5/2003 | Clancy, III et al. | |
| 6,786,505 B2 | * | 9/2004 | Yoshida ........................ | 280/729 |
| 6,971,664 B2 | * | 12/2005 | Amamori ...................... | 280/729 |
| 7,066,487 B2 | * | 6/2006 | Sullivan et al. ............... | 280/729 |
| 7,654,561 B2 | * | 2/2010 | Webber et al. ................ | 280/729 |
| 7,695,002 B2 | * | 4/2010 | Choi ............................. | 280/729 |
| 7,762,576 B2 | * | 7/2010 | Cho ............................. | 280/729 |

(Continued)

FOREIGN PATENT DOCUMENTS

CN    201309464 Y    9/2009

(Continued)

OTHER PUBLICATIONS

Great Britain Intellectual Property Office, Search Report for the corresponding Great Britain Application No. GB0920280.5 mailed Mar. 3, 2010.

(Continued)

*Primary Examiner* — Drew Brown
(74) *Attorney, Agent, or Firm* — Frank A. MacKenzie; Brooks Kushman P.C.

(57) ABSTRACT

An airbag assembly for a motor vehicle is disclosed having an airbag 110 that is inflated by an inflator when the airbag 110 is deployed in accordance with a control signal from an electronic controller. The airbag 110 has a main chamber 114 and at least one subsidiary chamber 116 fluidly connected to the main chamber 114 by a transfer vent 117. The main and subsidiary chambers 114 and 116 are vented to atmosphere by respective vents 115, 118 and the pressure in the subsidiary chamber 116 is arranged to be equal to or lower than the pressure in the main chamber 114. The subsidiary chamber 116 is produced in a simple manner by forming a depression in the main chamber 114 using a tether 124 and covering the depression so formed with a cover 125.

20 Claims, 11 Drawing Sheets

U.S. PATENT DOCUMENTS

| | | | |
|---|---|---|---|
| 7,938,445 B2 * | 5/2011 | Smith et al. | 280/743.2 |
| 7,946,613 B2 * | 5/2011 | Rose et al. | 280/729 |
| 2002/0017774 A1 * | 2/2002 | Igawa | 280/728.2 |
| 2002/0113416 A1 * | 8/2002 | Uchida | 280/729 |
| 2003/0030254 A1 * | 2/2003 | Hasebe | 280/729 |
| 2003/0178831 A1 | 9/2003 | Roberts et al. | |
| 2005/0023811 A1 | 2/2005 | Thomas | |
| 2006/0202456 A1 * | 9/2006 | Bernat | 280/739 |
| 2007/0262570 A1 * | 11/2007 | Choi | 280/729 |
| 2009/0218796 A1 | 9/2009 | Webber et al. | |
| 2010/0225094 A1 * | 9/2010 | Rose et al. | 280/729 |
| 2010/0225095 A1 * | 9/2010 | Smith et al. | 280/729 |

FOREIGN PATENT DOCUMENTS

| | | |
|---|---|---|
| DE | 102006051553 A1 | 5/2008 |
| EP | 1679237 A2 | 7/2006 |
| EP | 1842742 A2 | 10/2007 |
| JP | 2007331667 A | 12/2007 |
| WO | 0204255 A2 | 1/2002 |

OTHER PUBLICATIONS

GB Search Report dated Oct. 26, 2009, pp. 1-2.

* cited by examiner

AIRBAG ASSEMBLY

CROSS-REFERENCE TO RELATED APPLICATIONS

This application claims foreign priority benefits under 35 U.S.C. §119(a)-(d) to GB 0912843.0, filed Jul. 23, 2009 and GB 0920280.5, filed Nov. 19, 2009, which are hereby incorporated by reference in their entirety.

BACKGROUND

1. Technical Field

This disclosure relates to an airbag assembly for a motor vehicle and in particular to an airbag assembly for an out-of-position occupant.

2. Background Art

It is known that the use of an airbag may reduce injury to an occupant of a vehicle in the event of a serious collision.

It is a problem with known airbag systems that although an airbag may provide good protection for a correctly positioned occupant such as an unbelted fiftieth percentile male, the same airbag may fail to prevent injury to fifth percentile female occupant seated closer to the inflating airbag due to the high inflation pressure required to provide protection for the unbelted fiftieth percentile male and the location of contact of the airbag with the occupant. It has therefore been proposed to use a seat position sensor such as that disclosed in U.S. Pat. No. 6,561,544 to determine the position of a seat adjacent an airbag and to increase the venting of the airbag if the seat is determined to be in a forward position. This system would be relatively expensive to implement.

It would be desirable to provide an airbag assembly that is economical to manufacture and automatically provides, by its design, a reduced risk to an out-of-position occupant such as an occupant of small stature.

SUMMARY

An airbag assembly is disclosed that is economical to manufacture and automatically provides, by its design, a reduced risk to an out-of-position occupant such as an occupant of small stature.

According to a first embodiment of the disclosure there is provided an airbag assembly which includes an airbag and an inflator to inflate the airbag when the airbag is deployed. The airbag includes a main chamber having at least one main vent to vent gas from the main chamber to atmosphere and at least one subsidiary chamber of considerably smaller volume than the main chamber connected to the main chamber by at least one transfer vent formed in a common wall between the respective subsidiary chamber and the main chamber, each subsidiary chamber having at least one subsidiary vent to vent gas from the respective chamber to atmosphere wherein the airbag has a main wall fastened on each longitudinal edge to a respective side wall and at least one tether is connected to the main wall to form a depression in the main wall when the airbag is deployed corresponding to the location of each subsidiary chamber and a cover member is attached to the main wall and the two side walls to cover each depression to form the respective subsidiary chamber.

This arrangement is cost effective and provides improved protection for an occupant of small stature or an out-of-position occupant.

The size of each subsidiary vent may be such that, when the respective subsidiary chamber is impacted by an occupant, the pressure in the subsidiary chamber may always be lower than or equal to the pressure in the main chamber.

The airbag may have a single main chamber and a single subsidiary chamber and the main chamber may be substantially heart shaped in cross-section when the main chamber is fully inflated.

The main wall may be made of a coated fabric that is gas impermeable.

Each side wall may be sealingly fastened to the main wall by stitching.

Each side wall may be made of a coated fabric that is gas impermeable.

Each cover member may be sealingly attached around its periphery to the main wall and the two side walls by stitching it in place.

The main wall may be fastened along one edge to a left side wall and is fastened along an opposite edge to a right side wall and at least one of the left and right side walls has at least one main vent formed therein.

Both of the side walls may have at least one main vent formed therein.

The main wall may be fastened along one edge to a left side wall and may be fastened along an opposite edge to a right side wall and at least one of the left and right side walls may have at least one subsidiary vent for each subsidiary chamber formed therein.

Both of the side walls may have at least one subsidiary vent formed therein.

Each cover member may be sealingly attached around its periphery to the main wall and the two side walls and in at least one location there may be a length of the periphery of the cover member that is not sealingly attached to form a subsidiary vent.

Each cover member may be made from gas permeable fabric so that the cover member itself forms the subsidiary vent for the respective subsidiary chamber.

Each cover member may be attached around its periphery to the main wall and the two side walls by stitching it in place and the pitch of the stitches used to attach the cover member is large to provide a controlled gas leak that forms the subsidiary vent when the respective subsidiary chamber is inflated.

The airbag may have one main chamber and one subsidiary chamber.

The subsidiary chamber may be located on the airbag such that, when the airbag is inflated, the subsidiary chamber is positioned to react against the head of a fifth percentile female occupant.

The peak inflation pressure in the main chamber may be greater than or equal to the peak inflation pressure in the one, or each, subsidiary chamber.

The ratio of the peak inflation pressure in the main chamber to the peak inflation pressure in a respective subsidiary chamber may be based upon the relative total effective cross-sectional areas of all vents for the main chamber and all vents in the respective subsidiary chamber and the total effective cross-sectional area of the transfer vent fluidly connecting the main chamber to the respective subsidiary chamber.

At least one of the vents may be a self-regulating vent arranged to automatically reduce the flow of gas from one of the chambers of the airbag during deflation of the airbag.

The at least one self regulating vent may be operable to maintain the pressure in the main chamber at a higher level during a final phase of airbag deflation to extend the period of protection provided by the main chamber.

The self-regulating vent may be controlled by the gas flowing through the vent and is arranged to automatically reduce the flow area of the vent when the pressure of the gas flowing through the vent falls thereby further reducing the flow of gas through the vent.

The self-regulating vent may include a collapsible tube that is inflated by the pressure of the gas flowing therethrough and which collapses when the pressure of the gas flowing through the tube falls thereby reducing the flow area of the tube and increasing the restriction to flow of gas through the tube.

The self-regulating vent may be controlled by the tension in a tether attached to the vent and is arranged to automatically increase the restriction to flow when the tension in the tether reduces during deflation of the airbag.

The self-regulating vent may comprise a valve element attached to a tether overlying an aperture in a wall of the airbag.

The valve element may be constructed to automatically cover the aperture and be arranged to be pulled away from the wall to uncover the aperture by the tether when the airbag is above a predetermined level of inflation.

The wall may be the wall separating the main and subsidiary chambers and the self regulating vent may be the transfer vent.

Alternatively, the self-regulating vent may comprise a slit in a wall of the airbag and a tether attached adjacent to the slit.

The tether may be operable to increase the width of the slit when tension is applied to it thereby increasing the area of the vent and reducing the resistance to flow of gas through the slit.

According to another embodiment of the disclosure there is provided a motor vehicle having an airbag assembly constructed in accordance with other embodiments.

The airbag may have a main chamber and a single subsidiary chamber and the subsidiary chamber may be located on the airbag for reaction against the head of a belted fifth percentile female occupant of the motor vehicle when the airbag is inflated.

The subsidiary chamber may be located on the airbag such that, when the airbag is inflated, the subsidiary chamber is positioned below the Centre of Gravity of the head of an unbelted fiftieth percentile male occupant to ensure the main chamber reacts against the chest and head of the occupant.

The airbag assembly may be attached to an instrument panel of the motor vehicle to provide protection for a front seat passenger of the motor vehicle.

BRIEF DESCRIPTION OF THE DRAWINGS

The disclosure will now be described by way of example with reference to the accompanying drawing of which.

DETAILED DESCRIPTION

Figure 1:
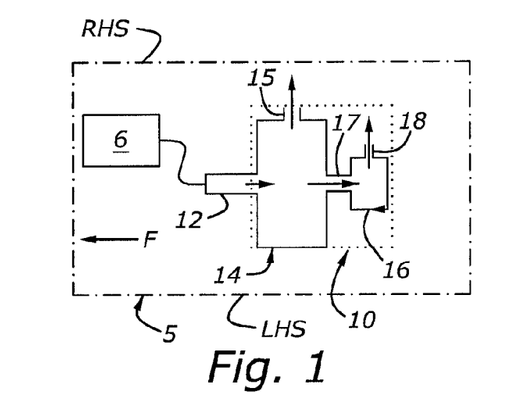
FIG. 1 is a block diagram of a motor vehicle having an airbag assembly according to the disclosure.

With reference to FIG. 1, there is shown a motor vehicle 5 that has a left hand side LHS, a right hand side RHS and a front indicated by the arrow "F" on FIG. 1. The motor vehicle 5 has an electronic controller 6 that may perform many tasks; but in this case is used to determine when an airbag 10 forming part of an airbag assembly should be deployed.

The airbag assembly includes the airbag 10 and an inflator 12, which is used to provide gas to inflate the airbag 10, thereby deploying it.

The airbag 10 has, in this case, a main chamber 14 and a single subsidiary chamber 16; but in other embodiments, there could be more than one secondary chamber 16. Each secondary chamber 16 is fluidly connected to the main chamber 14 by one or more transfer vents 17; and the size (cross-sectional area) of the transfer vent 17 determines how quickly the subsidiary chamber is filled.

The main chamber 14 is of a considerably larger volume than the subsidiary chamber 16. In the example shown, the main chamber has a volume four times that of the subsidiary chamber 16.

The main chamber 14 has a main vent 15 to limit the maximum pressure in the main chamber 14 and to allow gas to escape to atmosphere at the end of the inflation process to provide a controlled collapse of the main chamber 14 that can be used to absorb energy from an impacting occupant.

Although a single main vent 15 is shown in the right hand side of the main chamber, it will be appreciated that there could also be a vent on the left hand side or there could be vents on both sides of the main chamber or in other locations where the gas can be safely emitted without risking direct impingement against an occupant of the vehicle. It will also be appreciated that although the main vent is shown as a single aperture, each main vent could be formed by a number of separate apertures that in combination have the required cross-sectional area.

One significant feature of the disclosure is that the subsidiary chamber 16. and in the case of multiple subsidiary chambers, each subsidiary chamber has at least one subsidiary vent 18 that allows gas to vent from the respective subsidiary chamber 16 to atmosphere. This enables the damping of the subsidiary chamber 16 to be designed different from that of the main chamber 14.

The subsidiary vent 18 has two functions. First, during the inflation phase, it limits the pressure that can be reached in the subsidiary chamber 16. Second, when the secondary chamber 16 is impacted by an occupant of the vehicle 5 it allows gas to escape. If no secondary vent 18 were provided, then the pressure of gas in the secondary chamber 16 can rise above the pressure in the main chamber 14 as the subsidiary chamber 16 is compressed due to impact by an occupant.

By using a transfer vent 17 of a small effective cross-sectional area, the inflation of the subsidiary chamber 16 from the main chamber 14 is restricted thereby causing a delay in the filling of the subsidiary chamber 16 relative to the main chamber 14. This delayed filling/inflation reduces the risk of injury to an out-of-position occupant as the subsidiary chamber 16 is soft compared to the main chamber 14. On addition, the subsidiary chamber 16 does not expand in an aggressive manner.

The peak inflation pressure in the main chamber 14 is arranged, by virtue of the relationship between the main and subsidiary vents 15 and 18, to be greater than the peak inflation pressure in the subsidiary 16 or each subsidiary chamber 16. In fact, the pressure in the main chamber 14 can be arranged to be greater than the pressure in the subsidiary chamber 16 at all times. This is because the subsidiary chamber 16 is filled from the main chamber 14 via the transfer vent 17 and so cannot be greater that main chamber 14. When the airbag 10 is impacted by an occupant, the presence of the subsidiary vent 18 can ensure that the pressure in the subsidiary chamber 16 remains low relative to the main chamber 14.

The ratio of the peak inflation pressure in the main chamber 14 to the peak inflation pressure in each subsidiary chamber 16 is based upon the relative total effective cross-sectional areas of all vents 15 for the main chamber 14 and all vents 18 in the respective subsidiary chamber 16 and the total effective cross-sectional area of the transfer vent 17 fluidly connecting the main chamber 14 to the respective subsidiary chamber 16 and the relative volumes of the main and subsidiary chambers 14 and 16.

The peak pressure in the main chamber 14 may be in the range of 10 to 50 kPa; whereas, in the subsidiary chamber it may be in the range of 5 to 50 kPA.

Figure 2A:
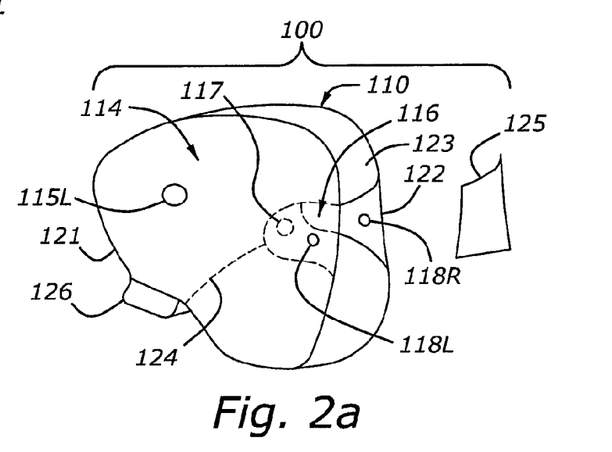
FIG. 2a is a representation of a first embodiment of an airbag according to the disclosure in a partly-assembled state showing the airbag in a fully-inflated state.
Figure 2B:
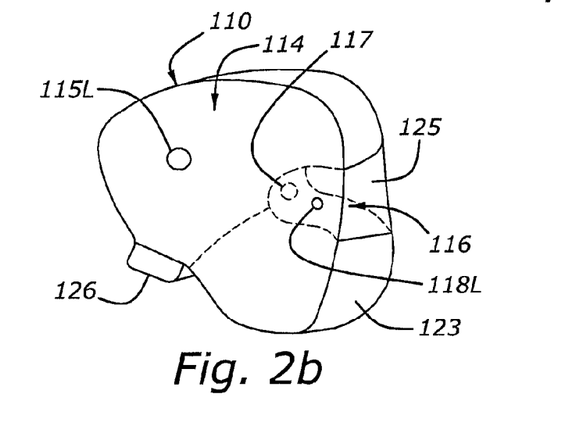
FIG. 2b is a representation of the airbag shown in FIG. 2a in a fully-assembled state.

Referring now to FIGS. 2a and 2b there is shown a first embodiment of an airbag assembly according to the disclosure. The airbag assembly 100 has an airbag 110 and a reactor can 126 that houses an inflator (not shown). The airbag 110 is secured to the reactor can 126 and the reactor can 126 is secured in use to a structural part of a motor vehicle.

The airbag 110 has a main wall 123 made from a length of coated gas impermeable fabric fastened on each longitudinal edge to a respective side wall 121, 122. Each of the side walls 121, 122 is made from a piece of coated gas impermeable fabric and is sealingly fastened to the main wall 123 by stitching. The main wall 123 forms in combination with the left and right side walls 121 and 122 a main chamber 114 of the airbag 110. It will be appreciated that the main wall 123 and the two side walls 121, 122 could each be made from more than one piece of fabric.

A tether 124 is connected at one end to the reaction can 126 and at an opposite end to the main wall 123 to form a depression in an occupant facing part of the main wall 123 when the airbag 110 is deployed. It will be appreciated that each depression may be formed by the use of more than one tether and that in other embodiments more than one depression may be formed.

The depression forms, in combination with a cover member 125, a subsidiary chamber 116 that is separated from the main chamber 114 by the main wall 123 that forms a common wall between the main and subsidiary chambers 114 and 116. The depression, therefore, corresponds to the location of the subsidiary chamber 116.

The cover member 125 is made from a piece of coated gas impermeable fabric and is sealingly attached around its periphery to the main wall 123 and to the left and right hand side walls 121 and 122 by stitching it in place to cover the depression and form the subsidiary chamber 116.

An aperture 117 is formed in the main wall 123 in the region of the depression to form a transfer vent between the main chamber 114 and the subsidiary chamber 116.

The left hand side wall 121 has a first aperture 115L in it to form a main vent for the main chamber 114 and a second aperture 118L within the region of the depression to form a subsidiary vent for the subsidiary chamber 116.

The right hand side wall 122 has a first aperture 115R (not visible on FIG. 2a or 2b) in it to form a further main vent for the main chamber 114 and a second aperture 118R within the region of the depression to form a subsidiary vent for the subsidiary chamber 116.

As previously referred to with respect to FIG. 1, when the airbag 110 is deployed, the main chamber 114 fills rapidly with gas from the inflator and the pressure in the main chamber 114 rises rapidly because the flow of gas into the main chamber 114 is greater than the flow out via the two main vents 115L and 115R. In addition, at least during an initial stage of inflation, the two main vents 115L and 115R are obstructed by the folded nature of the airbag 110 and so no gas can escape from the main chamber 114 through either of the main vents 115L and 115R until the airbag 110 is at least partially deployed.

As the main chamber 114 begins to fill with gas, the transfer vent 117 becomes uncovered by the unfolding of the airbag 110 and gas then begins to flow into the subsidiary chamber 116. The pressure within the subsidiary chamber 116 is always lower than the pressure in the main chamber 114; and, the subsidiary chamber 116 fills more slowly than the main chamber 114 due to the restrictive nature of the transfer vent 117.

Eventually, the airbag 110 reaches a fully deployed state as shown in FIG. 2b which occurs just prior to the time that a correctly seated belted occupant would be expected to impact against the airbag 110. When the main chamber 114 is fully deployed, it is substantially heart shaped in cross-section. This is advantageous in that this provides good stability for the secondary chamber 116 and provides, via a lower portion of the heart shaped primary chamber 114, good protection for a torso of an occupant; and, via the upper portion of the heart shaped main chamber 114, provides a stabilizing effect to the airbag 110 by its reaction against a windscreen or windshield of the motor vehicle. That is, the subsidiary chamber 116 sits between the upper and lower cheeks of the main chamber 114 when the main chamber 114 is fully inflated.

In the event of an out-of-position occupant, such as an occupant sitting too close to the airbag 110, that results in contact occurring while the airbag 110 is still inflating, then the presence of the subsidiary airbag 116 reduces the impact force due to: the subsidiary chamber 116 being at a lower pressure than the main chamber 114 and the subsidiary chamber 116 not expanding so rapidly as the main chamber 114. Furthermore, because the top part of the airbag 110 pressurizes and unfolds towards a windscreen of the vehicle and the bottom part of the airbag 110 unfolds and deploys between the torso of an occupant and an instrument panel of the vehicle, this redirects the load away from the head and neck of an occupant, which is desirable in an out-of-position case.

In one arrangement, the subsidiary chamber 116 is located such that the head of a fifth percentile female belted occupant impinges it thereby greatly reducing the risk of neck injury, as will be described in greater detail hereinafter.

Figure 3A:
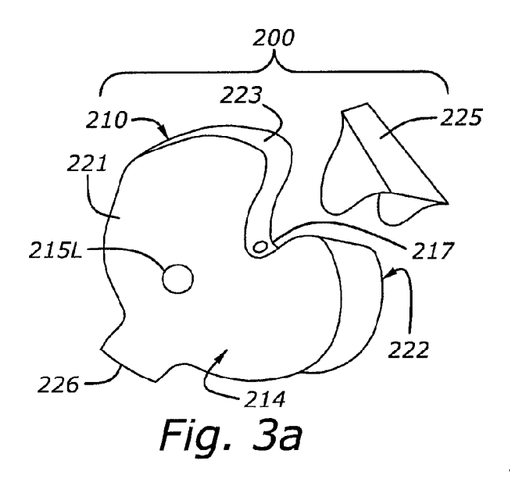
FIG. 3a is a representation of a second embodiment of an airbag according to the disclosure in a partly-assembly state showing the airbag in a fully-inflated state.
Figure 3B:
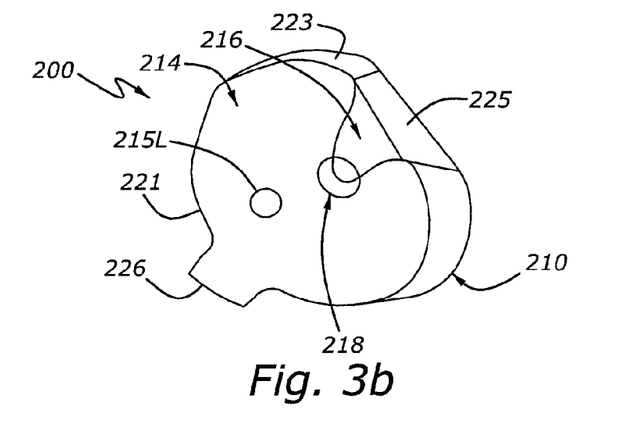
FIG. 3b is a representation of the airbag shown in FIG. 3a in a fully-assembled state.

The main vents 115L, 115R and the subsidiary vents 118L, 118R are located on the sides of the airbag 110. This vent arrangement causes gas exiting from these vents 115L, 115R; 118L, 118R to be directed away from the occupant. Referring now to FIGS. 3a and 3b, there is shown a second embodiment of an airbag assembly according to the disclosure.

The airbag assembly 200 has an airbag 210 and a reactor can 226 which houses an inflator (not shown). The airbag 210 is secured to the reactor can 226 and the reactor can 226 is secured in use to a structural part of a motor vehicle.

The airbag 210 has a main wall 223 made from a length of coated gas impermeable fabric fastened on each longitudinal edge to a respective side wall 221, 222. Each of the side walls 221, 222 is made from a piece of coated gas impermeable fabric and is sealingly fastened to the main wall 223 by stitching.

The main wall 223 forms, in combination with the left and right side walls 221 and 222, a main chamber 214 of the airbag 210.

A tether (not shown) is connected at one end to the reaction can 226 and at an opposite end to the main wall 223 to form a depression in an occupant facing part of the main wall 223 when the airbag 210 is deployed. It will be appreciated that each depression may be formed by the use of more than one tether.

In this embodiment, the side walls 221, 222 are of a truncated heart shape so that their peripheries conform to the shape of the depression in the main wall 223.

The depression forms, in combination with a cover member 225, a subsidiary chamber 216 that is separated from the main chamber 214 by the main wall 223. The depression, therefore, corresponds to the location of the subsidiary chamber 216.

The cover member 225 is made from a piece of coated gas impermeable fabric and is sealingly attached around its periphery to the main wall 223 and to the left and right hand side walls 221 and 222 by stitching it in place to cover the depression and form the subsidiary chamber 216.

An aperture 217 is formed in the main wall 223 in the region of the depression to form a transfer vent between the main chamber 214 and the subsidiary chamber 216.

The left hand side wall 221 has an aperture 215L to form a main vent for the main chamber 214 and the right hand side wall 122 has an aperture 215R (not visible on FIG. 3a or 3b) in it to form a further main vent for the main chamber 214.

In this embodiment, the vent for the subsidiary chamber can be formed in several ways. First, one or more apertures can be formed in the cover member 225 on the portions of the cover member 225 that extend down the sides of the airbag 110.

Alternatively, the cover member 225 could be sealingly attached around its periphery to the main wall 223 and the two side walls 221, 222. In at least one location (indicated by the circle 218 on FIG. 3b), there is a length of the periphery of the cover member 225 that is not sealingly attached to form a subsidiary vent. It will be appreciated that there could be more than one length of unstitched periphery. The vents may be positioned such that any vents do not direct gas directly onto the occupant.

As yet another alternative, the cover member 225 could be made from gas permeable fabric so that the cover member 225 itself forms the subsidiary vent for the respective subsidiary chamber.

As yet one further alternative, the cover member 225 could be attached around its periphery to the main wall 223 and the two side walls 221, 222 by stitching it in place. The pitch of the stitches used to attach the cover member 225 could be so large as to provide a controlled gas leak that forms the subsidiary vent when the respective subsidiary chamber is inflated.

When the airbag 210 is deployed, the main chamber 214 fills rapidly with gas from the inflator and the pressure in the main chamber 214 rises rapidly because the flow of gas into the main chamber 214 is greater than the flow out via the two main vents 215L and 215R.

As the main chamber 214 begins to fill with gas, the transfer vent 217 becomes uncovered by the unfolding of the airbag 210 and gas then begins to flow into the subsidiary chamber 216. The pressure within the subsidiary chamber 216 is always less than or equal to the pressure in the main chamber 214. The subsidiary chamber 216 fills more slowly than the main chamber 214 due to the restrictive nature of the transfer vent 217.

Eventually the airbag 210 reaches a fully deployed state, as shown in FIG. 3b, just prior to the time that a correctly seated belted occupant would be expected to impact the airbag 210.

In the event of an out-of-position occupant, the impact force will be lower due to the fact that the subsidiary chamber 216 is at a lower pressure than the main chamber 214 and that the subsidiary chamber 216 is not expanding so rapidly as the main chamber 214.

One arrangement of the airbag 210 is when the subsidiary chamber 216 is located such the head of a fifth percentile female belted occupant impinges it hereby reducing the risk of neck injury.

With reference to FIGS. 4 to 6b, there is shown an airbag assembly having an airbag 310 that is constructed similar to that shown in FIGS. 2a and 2b.

As before, the airbag 310 is constructed from two side walls 321, 322 stitched to a main wall 323 all of which are made from a gas impermeable material. The main wall 323 is deformed by a tether (not show) to form a depression (not shown) that is covered by a cover member 325 made from a gas impermeable material that is sewn in place to form a subsidiary chamber 316 (not shown on FIGS. 4, 5a and 6a).

The main wall 323 separates the subsidiary chamber from a main chamber 314 (not shown on FIGS. 4, 5a and 6a) and an aperture in the main wall 323 in the region of the depression form a transfer vent (not shown) that allows gas to flow from the main chamber 314 to the subsidiary chamber 316 when the airbag 310 is being deployed.

The left and right hand side walls 321, 322 each have a first and second apertures 315L, 315R and 318L, 318R formed in them to act as main and subsidiary vents respectively of which only the apertures 315L, 318L on the left side of the airbag 310 are visible.

Figure 4:
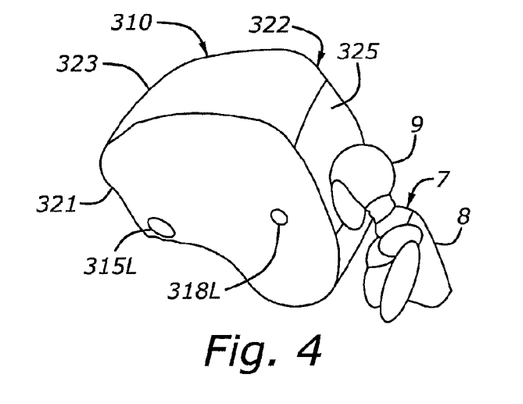
FIG. 4 is a representation of an airbag according to the disclosure having a main chamber and a single subsidiary chamber in a fully inflated state at a point in time that a fifth percentile female test dummy impacts the airbag.
Figure 5A:
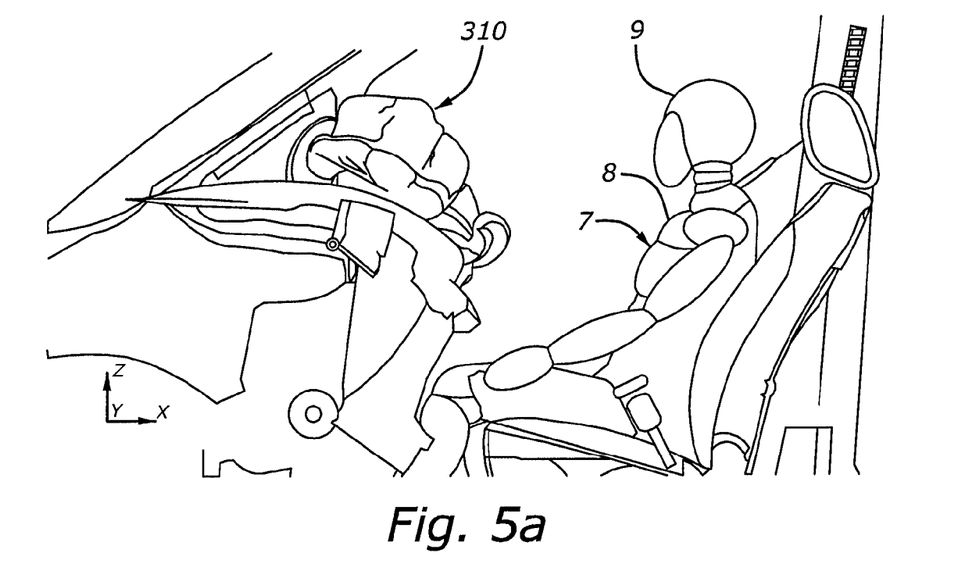
FIG. 5a is a side view of the airbag shown in FIG. 4 shown at a time when the airbag is starting to deploy.
Figure 5B:
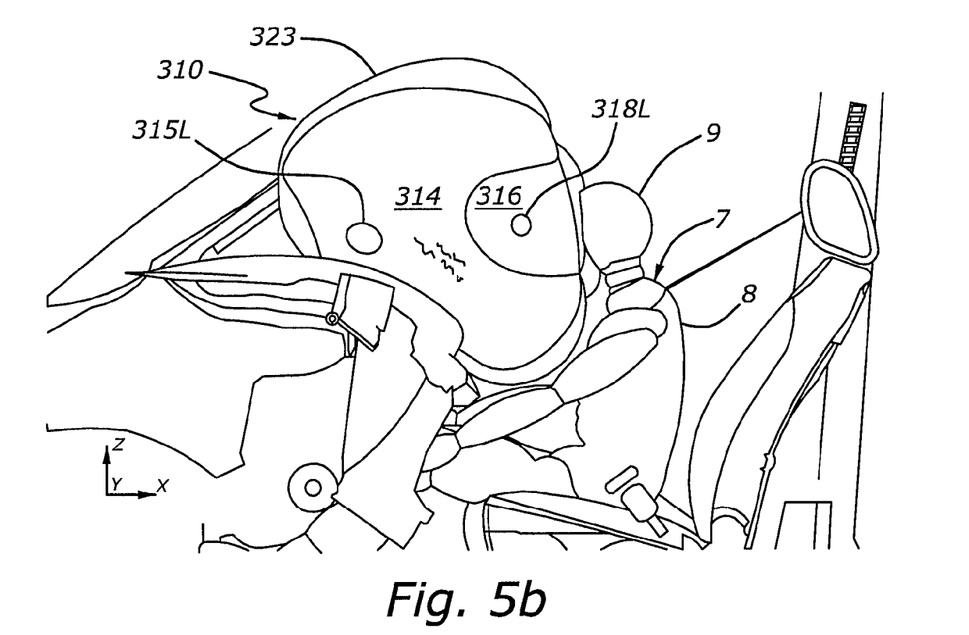
FIG. 5b is a side view corresponding to the view shown in FIG. 4.

With particular reference to FIGS. 4 and 5b, which show the impact position for a fifth percentile belted female, it can be seen that the subsidiary chamber 316 is positioned such that the head 9 of the occupant 7 (in this case a crash dummy) impacts the cover 325 of the subsidiary chamber 316. This ensures that the loading placed upon a neck of the occupant 7 is reduced due to the lower pressure in the subsidiary chamber 316. It is particularly advantageous if the chin of the occupant impacts the airbag 310 at, or slightly below, the lower edge of the subsidiary chamber 316. This ensures that the head 9 of the occupant 7 rotates forwardly. This is due to the greater resistance imposed upon the chin by the main chamber 314 compared to the force imposed upon the forehead region of the head 9 by the subsidiary chamber 316. It will be appreciated by those skilled in the art that forward flexure of the neck is less likely to cause injury than rearward flexure. An airbag constructed in accordance with this disclosure, therefore, provides improved safety for a fifth percentile female compared to a single chamber airbag.

Figure 6A:
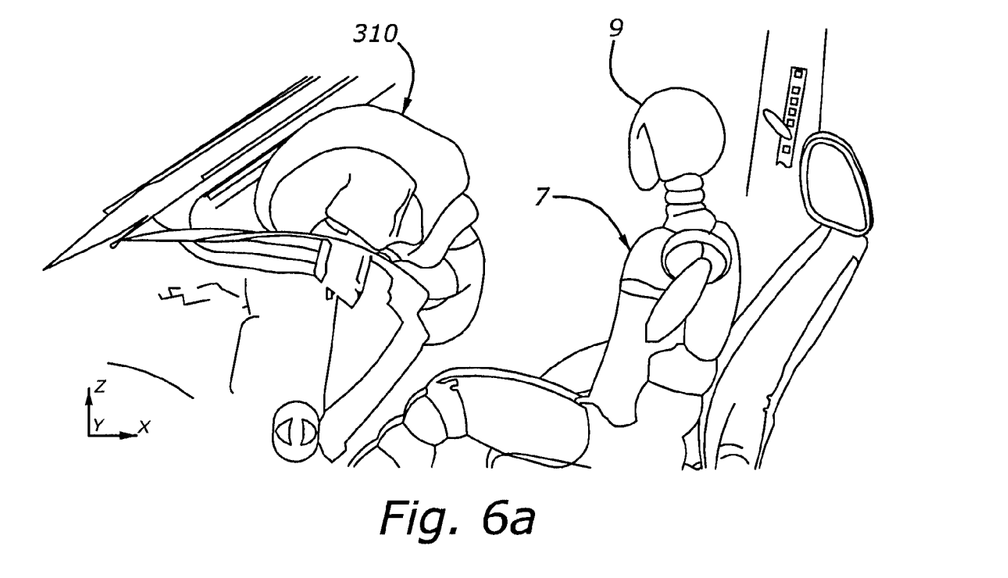
FIG. 6a is a side view of the airbag shown in FIG. 5a for the case where a fiftieth percentile unbelted male test dummy is used.
Figure 6B:
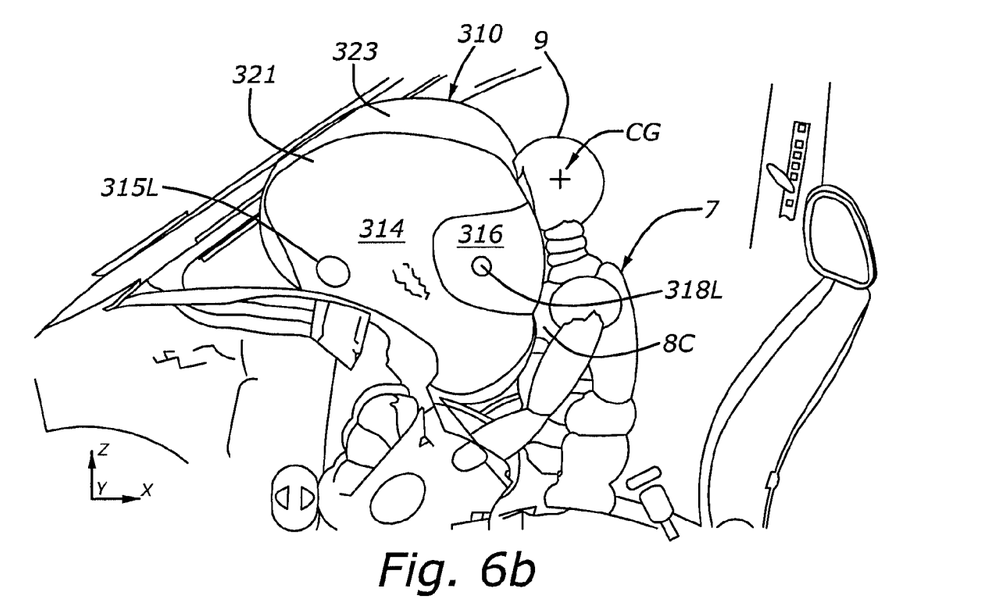
FIG. 6b is a side view corresponding to the view shown in FIG. 5b for the case where a fiftieth percentile unbelted male test dummy is used.

With reference to FIG. 6b, there is shown the impact position for a fiftieth percentile unbelted male occupant (in this case a crash dummy). The airbag 310 is identical to that shown in FIGS. 4 to 5b.

In this case, the subsidiary chamber 316 is located on the airbag 310 such that, when the airbag is inflated, the subsidiary chamber 316 is positioned below the Center of Gravity (CG) of the head 9 of an unbelted fiftieth percentile male occupant 7 to ensure the main chamber 314 reacts against a chest 8c and head 9 of the occupant 7. The subsidiary chamber 316 in this case reacts against the upper ribs of the occupant 7 which are known to be less elastic and hence prone to injury. In particular, the presence of the relatively soft subsidiary chamber 316 has the potential to reduce clavicle injuries which are common with an unbelted occupant impact of this type. It will be appreciated that the main chamber 314 supports the subsidiary chamber 316 and prevents push through of the unbelted occupant 7.

It is desired for airbags to prevent injury of all occupants including the two types of occupant referred to above because these are specifically legislated in Federal Motor Vehicle Safety Standards Part 571 Standard number 208. One of the advantages according to the disclosure is that an airbag with greatly improved performance for an out-of-position occupant such that an occupant of small stature can be constructed in accordance with the disclosure for insignificant additional cost compared to a conventional airbag having a single chamber.

A second advantage of the disclosure is that airbags having significantly different impact properties can be produced from the same basic design of airbag by simply varying the relative sizes of the three vents.

Figure 7:
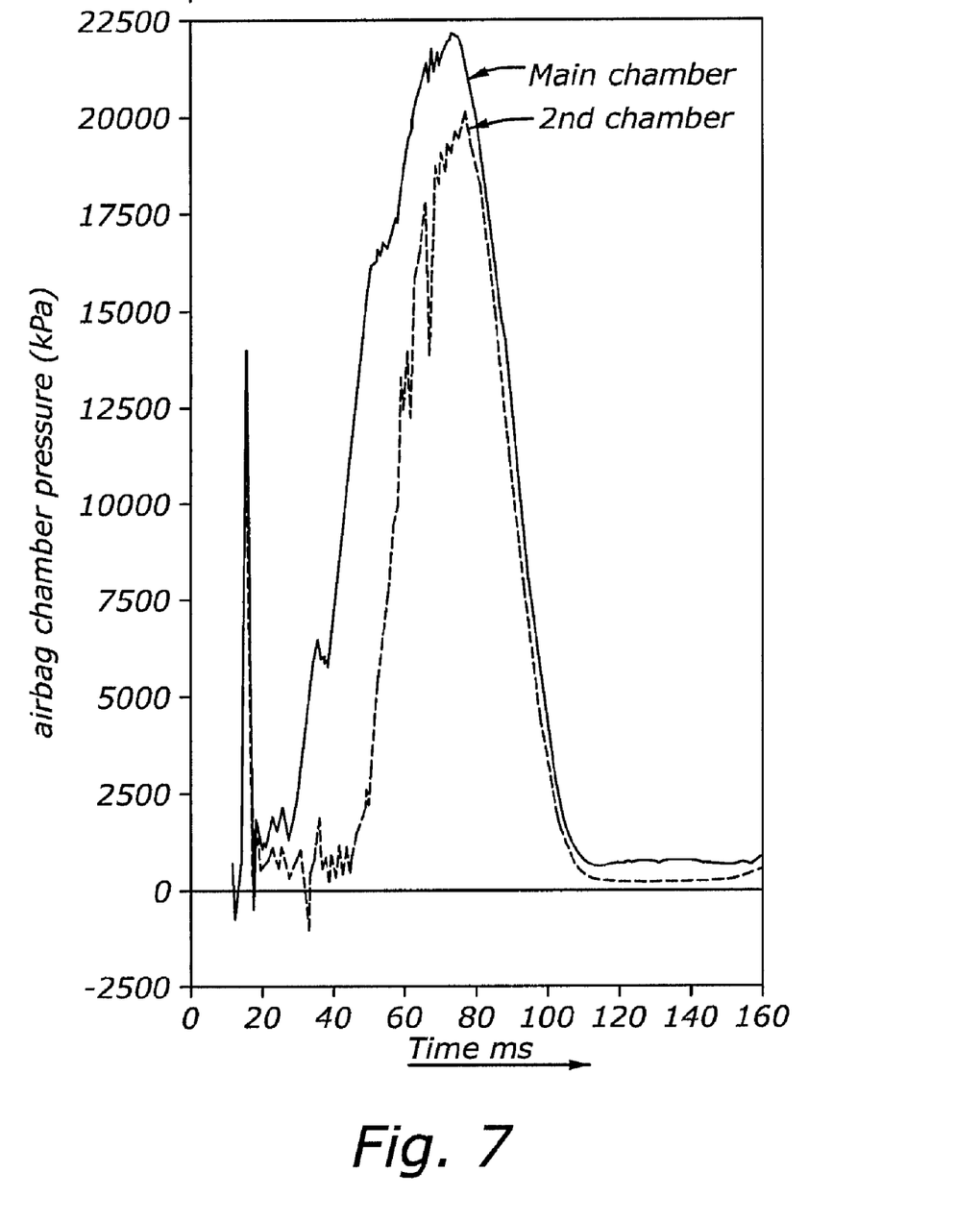
FIG. 7 is a chart showing inflation gas pressure for main and subsidiary chambers of an airbag constructed in accordance with this disclosure for a configuration in which the airbag has been designed to provide only a small difference in peak inflation pressure between the two chambers.

FIG. 7 shows pressure versus time results for the airbag 310 with relatively small subsidiary vents thereby allowing the peak pressure in the subsidiary chamber to reach 86% of the peak pressure in the main chamber 314. The size of the transfer vent is relatively large so that there is a relatively small delay in the inflation of the subsidiary chamber 316.

Figure 8:
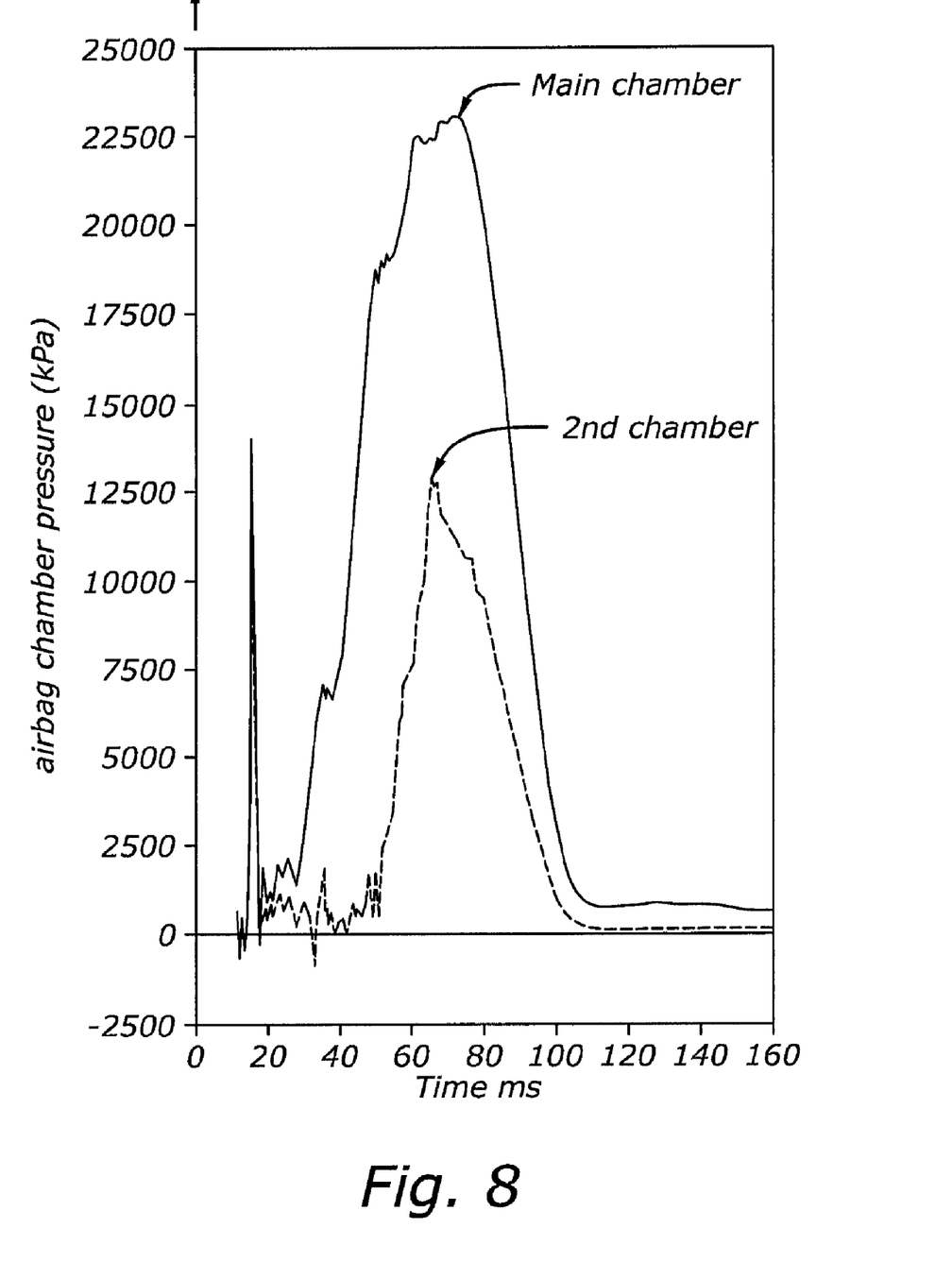
FIG. 8 is a chart showing inflation gas pressure for main and subsidiary chambers of an airbag constructed in accordance with this disclosure for a configuration in which the airbag has been designed to provide a large difference in peak inflation pressure between the two chambers.

FIG. 8, on the other hand, shows pressure versus time results for the airbag 310 with relatively large subsidiary vents thereby allowing the peak pressure in the subsidiary chamber to reach only 56% of the peak pressure in the main chamber 314. The size of the transfer vent in this case was smaller so that there is a longer delay in the inflation of the subsidiary chamber 316.

Figure 9:
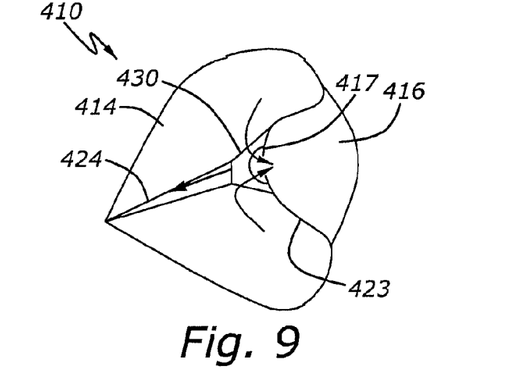
FIG. 9 is a partial, cut-away side view of a fully-inflated airbag having a self-regulating vent according to an embodiment of the disclosure.
Figure 10:
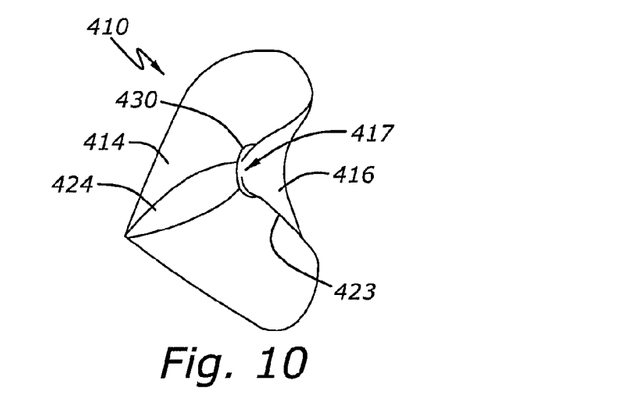
FIG. 10 is a view similar to that of FIG. 9 showing the airbag in a partially-deflated state.
Figure 11:
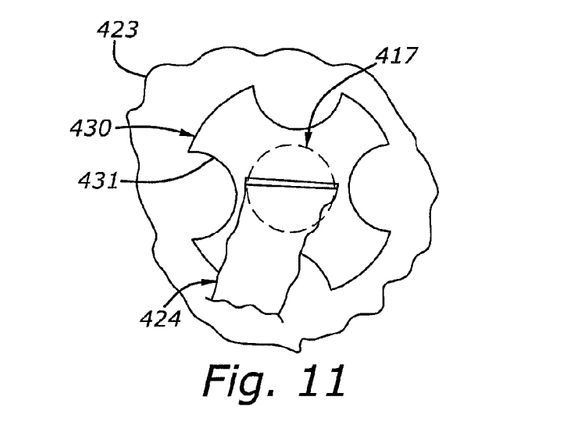
FIG. 11 is a front view on an enlarged scale of the self-regulating vent shown in FIGS. 9 and 10.

Referring now to FIGS. 9 to 11, airbag 410, that is in most respects identical to that previously described and which is intended to be a direct replacement for the airbags previously described, is shown. The airbag 410 has, as previously described, main and subsidiary chambers 414 and 416 separated by a common wall 423 in which is formed a transfer vent in the form of an aperture 417. In this case, the transfer vent is self regulating in that a valve member 430 is arranged to overlie the aperture 417 to restrict or prevent flow through the aperture 417. The valve member 430 has four legs 431 attached to the common wall 423 by stitching. An aperture is defined between adjacent pairs of legs 431 through which gas can flow when the valve member 430 is pulled away from the common wall 423 by a tether 424. The tether is attached at one end to the valve member 430 and is attached at an opposite end to a fixed member such as for example part of a reaction can (not shown). The valve member 430 is arranged to normally close off or restrict the flow of gas through the aperture 417.

Operation of the self-regulating valve member is as follows: after the airbag 410 starts to inflate, it expands until the tether 424 becomes taut at which point any further inflation of the airbag 410 causes the valve member 430 to be pulled away from the common side wall 423 thereby allowing gas to flow freely into the subsidiary chamber 416. During deflation of the airbag 410, a point is reached in which the tension in the tether 424 begins to fall and the valve member 430 begins to close thereby restricting the flow of gas from the main chamber 416 to the subsidiary chamber 416. The effect of this is to maintain the pressure in the main chamber 414 during the final phase of deflation higher than it would be if the aperture 417 remained fully uncovered. The maintenance of pressure is due to the fact that less or no gas can flow from the main chamber 414 out to atmosphere from the subsidiary vent or vents of the subsidiary chamber 416 once the valve member 430 has closed.

This increase in pressure late in the deflation phase is advantageous as it prolongs the period during which a cushioning or energy absorbing effect can be provided by the main chamber 414 and therefore further reduces the risk of an unbelted occupant pushing through the deflating airbag 410 and impacting a hard surface such as an instrument panel.

Figure 12A:
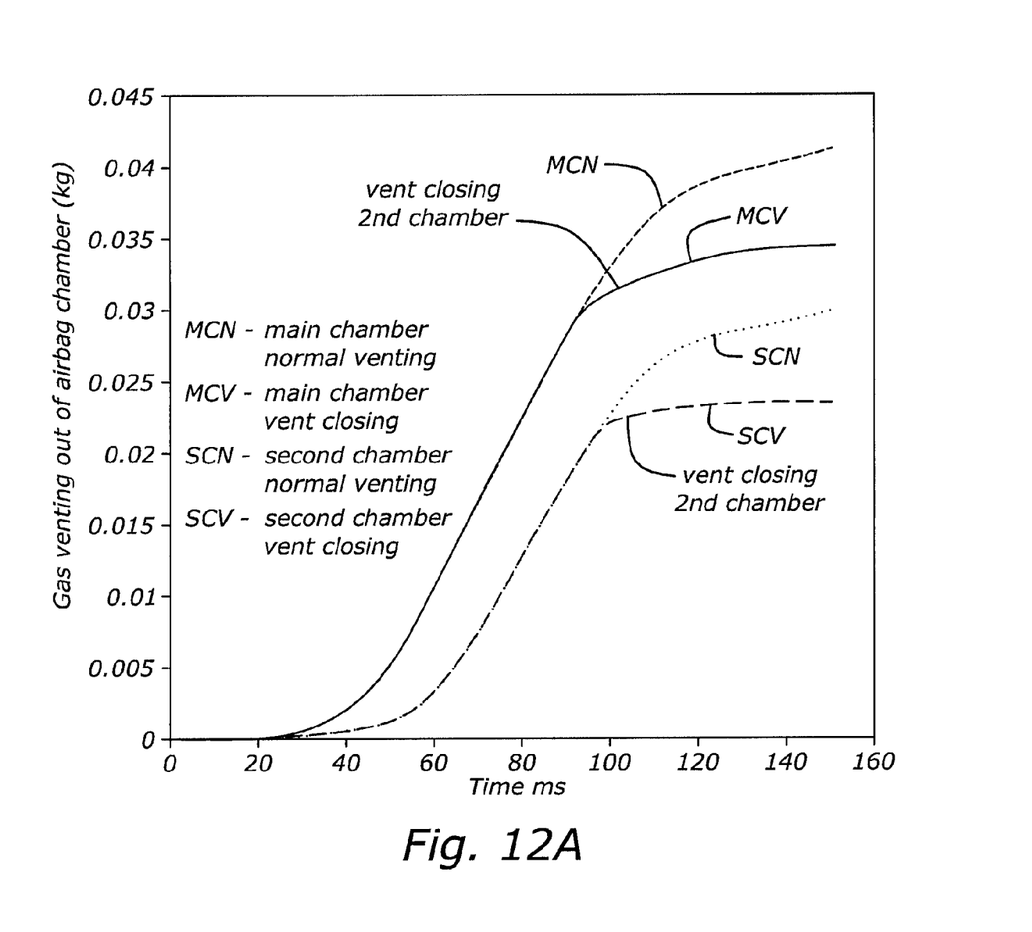
FIG. 12A is a chart showing the relationship between time and gas flow for an airbag having a standard vent and an airbag having a self-regulating vent.
Figure 12B:
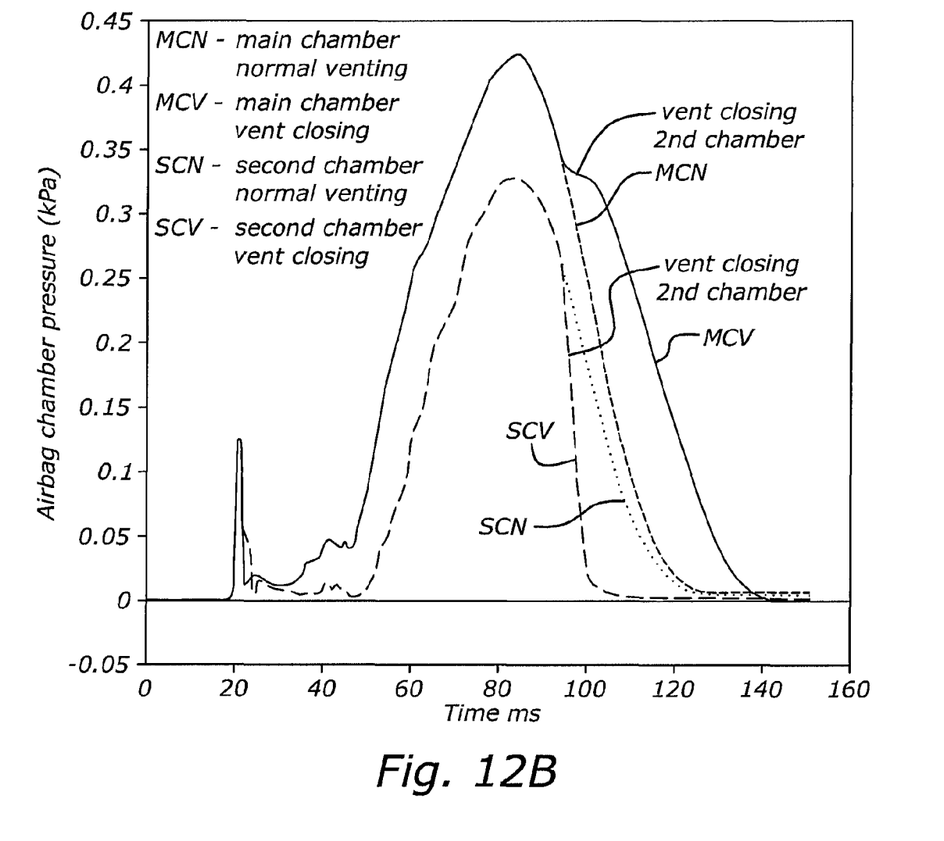
FIG. 12B is a chart corresponding to FIG. 12A showing the relationship between time and pressure.

FIGS. 12A and 12B show the effect of the use of a self-regulating valve 430 compared to an airbag having a conventional transfer vent. FIG. 12A shows that, in the case of the standard airbag, the flow of gas from the main and secondary chambers MCN and SCN continue at relatively high levels; whereas, for the airbag 410 with the self-regulating vent 430, the flow from the main and subsidiary chambers 414 and 416 reduces considerably after the self-regulating vent 430 closes when the tension in the tether 424 reduces after approximately 85 to 90 milliseconds. The effect of this reduction in gas flow is shown in FIG. 12B. In the main chamber, the pressure for the normal airbag, MCN, falls rapidly during deflation but for the airbag 410 with the self-regulating vent 430, the pressure MCV remains considerably higher.

In the case of the subsidiary chamber the pressure SCV falls more quickly for the airbag 410 with the self regulating vent 430 than for a normal airbag but this is not significantly detrimental to airbag performance as during the deflation phase it is occupant push through that is more important and it is the main chamber 414 which is relevant in this respect. Although the self regulating vent is described with reference to its use as a transfer vent it will be appreciated that a similar construction could be used to construct a main vent from the main chamber 414.

It will be appreciated that the pressures, flow rates, and time frames are merely exemplary in nature and that the disclosure is not limited to such pressures, flow rates, and time frames.

Figure 13:
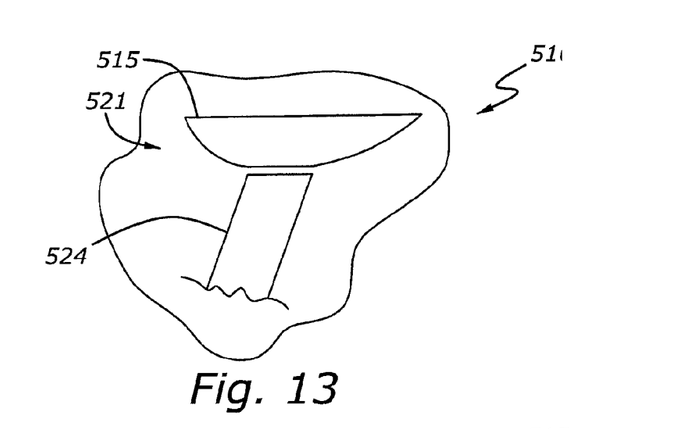
FIG. 13 is a partial view of an alternative form of self-regulating vent showing the configuration of the vent when an airbag, of which the vent forms a part, is fully inflated.
Figure 14:
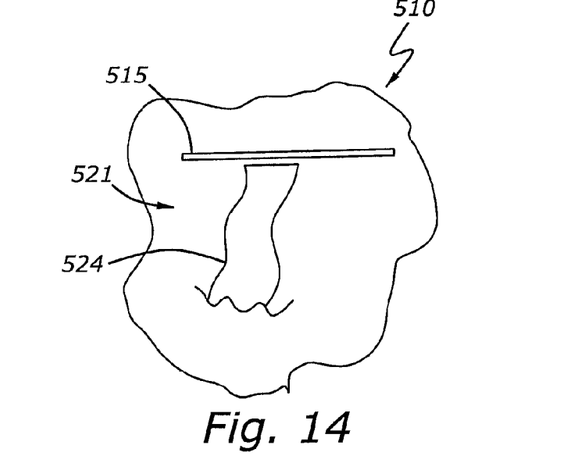
FIG. 14 shows the self-regulating vent of FIG. 13 when the airbag is in a final phase of deflation.

With reference to FIGS. 13 and 14, there is shown an alternative form of self-regulating vent for an airbag 510 having main and subsidiary chambers (not shown) that is intended to produce a similar effect as that previously described with respect to FIGS. 9 to 12B, but is of a more cost-effective construction. The self-regulating vent is formed from a slit vent 515 in a side wall 521 of an airbag 510 that vents air from a main chamber of the airbag 510. A tether 524 is attached at one end to the side wall 521 adjacent to the slit 515 and is attached at an opposite end to a fixed member such as a reactor can (not shown). In an unstressed state, the vent 515 is, as shown in FIG. 14, of a very narrow width and so provides a relatively small flow area through which gas can flow from the main chamber. It offers a high resistance to flow and acts to reduce the flow of gas from the main chamber. When the airbag 510 is inflated, the tether 524 is brought into tension by the expansion of the airbag 510. This causes it to pull on side wall 521 causing the slit 515 to be pulled apart, as shown in FIG. 13, thereby increasing the flow area and reducing the restriction to flow. This open configuration of the slit vent 515 allows sufficient gas to escape during inflation of the airbag 510 thereby preventing over inflation of the airbag 510 during deployment, which would make the airbag 510 difficult to deform when impacted by an occupant thereby reducing the effectiveness of the airbag 510. However, during deflation of the airbag 510, the tension on the tether 524 reduces as the airbag 510 collapses allowing the slit 515 to close thereby reducing the flow area and maintaining the pressure in the main chamber higher than it would otherwise be. It will be appreciated that a similar arrangement could be used to control the flow of gas through a transfer vent between main and subsidiary chambers.

Figure 15:
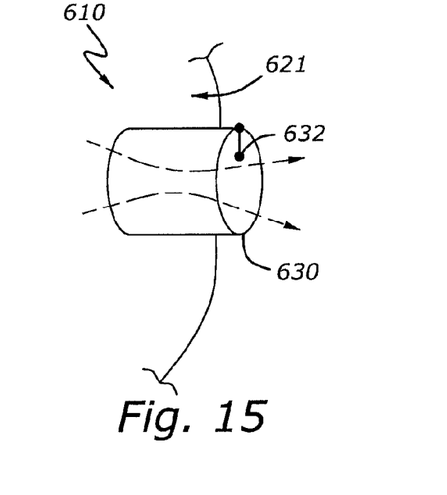
FIG. 15 is a representation of a self-regulating vent that is controlled by the flow of gas through the vent showing the vent when there is a significant flow of gas through the vent.
Figure 16:
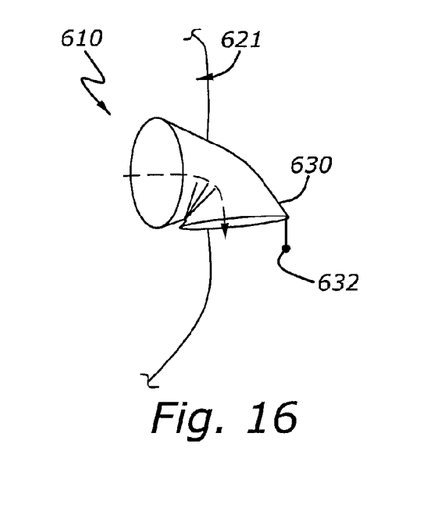
FIG. 16 shows the self-regulating vent of FIG. 15 during a final phase of deflation in which there is a low flow of gas through the vent.

With reference to FIGS. 15 and 16, there is shown an alternative form of self-regulating vent for an airbag 610 having main and subsidiary chambers (not shown) that is intended to produce a similar effect as that previously described with respect to FIGS. 9 to 12B. The self-regulating vent includes a collapsible tube 630 that is attached to a side wall 621 of the airbag 610 to provide a passage linking the main chamber of the airbag 610 to atmosphere. An outer end of the collapsible tube 630 is weighted as indicated by the reference numeral 632. The weighting 632 can be achieved by forming a heavy rim around the outer end of the collapsible tube 530 or in any other convenient manner. When little or no gas is flowing through the collapsible tube 630, it collapses as shown in FIG. 16 thereby reducing the flow area and increasing the resistance to flow of gas through the collapsible tube 630. When there is a considerable flow of gas through the collapsible tube 630, it acts to inflate the collapsible tube 630, as shown in FIG. 15. Therefore during inflation of the airbag 610, the collapsible tube 630 adopts an open configuration and allows sufficient gas to escape thereby preventing over inflation of the airbag 610. However, during deflation of the airbag 610, when the pressure in the main chamber falls to a certain level, the pressure within the collapsible tube 630 is no longer able to hold it in the fully inflated position and the end weight 632 closes the collapsible tube 630 thereby reducing the flow area and maintaining the pressure in the main chamber higher than it would otherwise be. It will be appreciated that such a construction could be used for any vent and is not limited for use as a main chamber vent.

Figure 17:
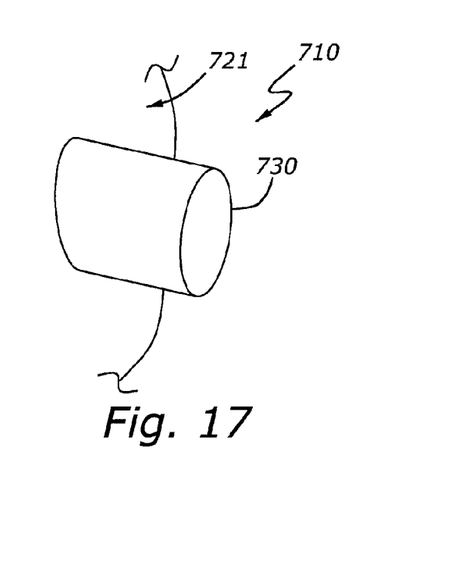
FIG. 17 is a view of a self-regulating vent that is controlled by the flow of gas through the vent showing the vent when there is a significant flow of gas through the vent.
Figure 18:
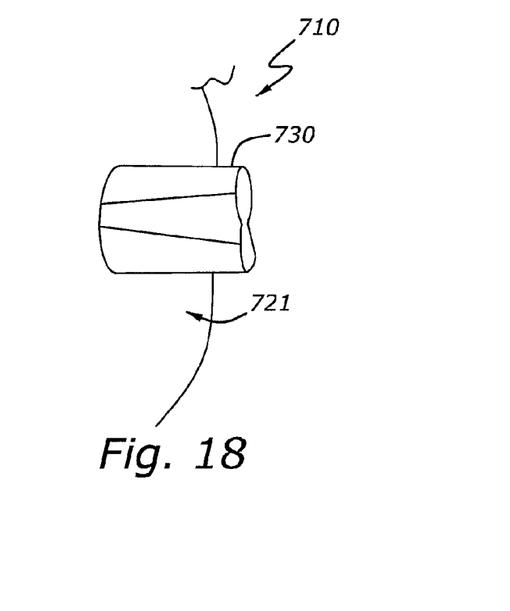
FIG. 18 shows the self-regulating vent of FIG. 17 during a final phase of deflation in which there is a low flow of gas through the vent.

With reference to FIGS. 17 and 18 there is shown a self-regulating vent for an airbag 710 having main and subsidiary chambers (not shown) that is intended to produce a similar effect as that previously described with respect to FIGS. 9 to 12B.

The self-regulating vent includes a collapsible tube 730 that is attached to a side wall 721 of the airbag 710 to provide a passage linking the main chamber of the airbag 710 to atmosphere. The collapsible tube 730 is formed so that in an unstressed state it adopts a collapsed condition in which its outer end forms two small apertures, as shown in FIG. 18, thereby reducing the flow area of the collapsible tube 730 and increasing the resistance to flow of gas through the collapsible tube 730. When there is a considerable flow of gas through the collapsible tube 730, it acts to inflate the collapsible tube 730, as shown in FIG. 17. Therefore, during inflation of the airbag 710, the collapsible tube 730 adopts an open configuration and allows sufficient gas to escape thereby preventing over inflation of the airbag 710. During deflation of the airbag 710, when the pressure in the main chamber falls to a certain level, the pressure within the collapsible tube 730 is no longer able to hold it in the fully inflated position and it closes thereby reducing the flow area and maintaining the pressure in the main chamber higher than it would otherwise be. It will be appreciated that such a construction could be used for any vent and is not limited for use as a main chamber vent.

A number of constructions of self-regulating vent have been disclosed that are able to maintain the pressure in the main chamber of a two chamber airbag higher than it would otherwise be during a later phase of deflation. The term, self-regulating vent, as meant herein, means a vent that, due to its construction, automatically controls the flow of gas passing therethrough in the desired manner and requires no external actuators or controllers.

The disclosure is therefore able to simply, and in a cost-effective manner, customize a single airbag design to suit many different situations.

Although the disclosure has been described with reference to several embodiments that use a simple aperture for each of the vents it will be appreciated that the disclosure is not limited to the use of such a vent and other types of vent could be used such as for example and without limitation a slit vent, a smart vent a silicon membrane vent or a combination of these types of vent.

One advantage of an airbag assembly constructed in accordance with this disclosure is that it does not require the occupant positioning and additional venting mechanism described in U.S. Pat. No. 6,561,544.

It will be appreciated by those skilled in the art that although the disclosure has been described by way of example with reference to one or more embodiments it is not limited to the disclosed embodiments and that one or more modifications to the disclosed embodiments or alternative embodiments could be constructed without departing from the scope of the disclosure as set out in the appended claims.

What is claimed:

1. An airbag comprising:
   a main chamber having at least one main vent to vent gas from the main chamber to atmosphere;
   at least one subsidiary chamber of considerably smaller volume than the main chamber connected to the main chamber by at least one transfer vent formed in a common wall between the respective subsidiary chamber and the main chamber wherein:

each subsidiary chamber has at least one subsidiary vent to atmosphere, the airbag has a main wall fastened on each longitudinal edge to a respective side wall and at least one shaping tether connected to the main wall to form a depression in the main wall when the airbag is deployed corresponding to the location of each subsidiary chamber and a cover member is attached to the main wall and the two side walls to cover each depression to form the respective subsidiary chamber, and wherein at least one of the vents is a self-regulating vent arranged to automatically reduce the flow of gas from one of the chambers during deflation of the airbag, the self-regulating vent controlled by tension in a vent tether attached to the vent and arranged to automatically increase the restriction to flow when the tension in the vent tether reduces during deflation of the airbag.

2. The airbag of claim 1 wherein each cover member is sealingly attached around its periphery to the main wall and the two side walls by stitching.

3. The airbag of claim 1 wherein the main wall is fastened along one edge to a left side wall and is fastened along an opposite edge to a right side wall and at least one of the left and right side walls has at least one main vent formed therein.

4. The airbag of claim 1 wherein the main wall is fastened along one edge to a left side wall and is fastened along an opposite edge to a right side wall and at least one of the left and right side walls has at least one subsidiary vent for each subsidiary chamber formed therein.

5. The airbag of claim 1 wherein each cover member is sealingly attached around its periphery to the main wall and the two side walls and in at least one location there is a length of the periphery of the cover member that is not sealingly attached to form a subsidiary vent.

6. The airbag of claim 1 wherein each cover member is made from gas permeable fabric so that the cover member itself forms the subsidiary vent for the respective subsidiary chamber.

7. The airbag of claim 1 wherein each cover member is attached around its periphery to the main wall and the two side walls by stitching it in place and the pitch of the stitches used to attach the cover member is large to provide a controlled gas leak that forms the subsidiary vent when the respective subsidiary chamber is inflated.

8. The airbag of claim 1 wherein the peak inflation pressure in the main chamber is greater than the peak inflation pressure in each subsidiary chamber.

9. The airbag of claim 1 wherein the ratio of the peak inflation pressure in the main chamber to the peak inflation pressure in a respective subsidiary chamber is based upon the relative total effective cross-sectional areas of all vents for the main chamber and all vents in the respective subsidiary chamber and the total effective cross-sectional area of the transfer vent fluidly connecting the main chamber to the respective subsidiary chamber and the relative volumes of the main chamber and each subsidiary chamber.

10. The airbag of claim 1 wherein the at least one self-regulating vent is operable to maintain the pressure in the main chamber at a higher level during a final phase of airbag deflation to extend the period of protection provided by the main chamber.

11. An airbag, comprising:
a main chamber having a main vent to atmosphere;
a subsidiary chamber of lesser volume than the main chamber connected to the main chamber by a transfer vent formed in a common wall between the subsidiary chamber and the main chamber wherein:
the subsidiary chamber has at least one subsidiary vent to atmosphere, and
at least one of the vents is a self-regulating vent arranged to automatically reduce the flow of gas from one of the chambers during deflation of the airbag, the self-regulating vent controlled by tension in a tether attached to the vent and arranged to automatically increase the restriction to flow when the tension in the tether reduces during deflation of the airbag.

12. The airbag of claim 11, further comprising:
an inflator coupled to the main chamber.

13. The airbag of claim 11, further comprising:
a main wall fastened on each longitudinal edge to a respective side wall,
a tether connected to the main wall to form a depression in the main wall when the airbag is deployed; and
a cover member attached to the main wall and the two side walls to cover the depression to form the subsidiary chamber.

14. The airbag of claim 13 wherein the cover member is made from gas permeable fabric.

15. The airbag of claim 13 wherein the cover member is attached around its periphery to the main wall and the two side walls by stitching.

16. The airbag of claim 15 wherein the pitch of the stitches used to attach the cover member is selected to provide a controlled gas leak to form the subsidiary vent.

17. An airbag, comprising:
a main chamber having a main vent; and
a subsidiary chamber connected to the main chamber by a transfer vent and having at least one subsidiary vent to atmosphere, wherein
at least one of the vents is controlled by a tether arranged such that tension in the tether decreases during deflation of the airbag, the decrease in tension causing an increase in restriction to flow of gas through the vent.

18. The airbag of claim 17, wherein the at least one vent comprises a valve member overlying an aperture in an airbag wall, the valve member arranged to be pulled away from the aperture and allow the flow of gas through the vent when the airbag is at full inflation, and the decrease in tension in the tether during deflation allowing the valve member move toward the aperture and so restrict the flow of gas through the vent.

19. The airbag of claim 18, the at least one vent is the transfer vent.

20. The airbag of claim 17, wherein the at least one vent comprises a slit vent and the tether is attached to an airbag wall adjacent to the slit vent.

* * * * *